United States Patent [19]

Stepp

[11] 4,431,072
[45] Feb. 14, 1984

[54] WEIGHING DEVICE

[76] Inventor: Sylvan G. Stepp, Rte. #2, North Branch, Minn. 55056

[21] Appl. No.: 337,157

[22] Filed: Jan. 5, 1982

[51] Int. Cl.³ .................. G01G 5/04; G01G 21/00
[52] U.S. Cl. ................................ 177/209; 177/126
[58] Field of Search ............... 177/126, 127, 134, 208, 177/209

[56] References Cited

U.S. PATENT DOCUMENTS

| 1,936,178 | 11/1933 | Sykes | 177/126 X |
| 2,857,152 | 10/1958 | Aske | 177/209 |
| 3,698,492 | 10/1972 | Lejeune | 177/208 X |
| 4,280,576 | 7/1981 | Smith, Jr. | 177/134 X |

Primary Examiner—George H. Miller, Jr.
Attorney, Agent, or Firm—John B. Dickman, III

[57] ABSTRACT

A portable weighing scale device is disclosed for determining the axle load weight of a vehicle such as a semi-truck, trailer and the like. The weighing scale device includes a platform with tire guide rails and inflatable air bags. An air pressure gauge is connected to the air bags to measure the vehicle axle weight.

6 Claims, 4 Drawing Figures

WEIGHING DEVICE

BACKGROUND OF THE INVENTION

This invention relates to a portable scale for weighing the axle load of vehicles such as large multiple axle trucks. It has been determined that the weight of downward pressure at any one wheel could cause damage to road bed, if excessive.

State governments have enacted laws to limit wheel load per axle to avoid damage to the roads. Most states now have truck weighing stations on major highways to check axle loads. These stations are used as part of the enforcement of state laws to enforce the weight limits of loads carried upon the axles of semi-trucks, trailer and the like.

Except for permanent truck weighing stations, scales are not available for weighing trucks.

Truckers often find that their load weight changes because of loading and unloading, therefore, it behooves them to have some means of checking the load weight before getting on the road. Because of the heavy fines imposed, truckers need a simple device for carrying with them to check load weights, however, there are no devices presently on the market which are accurate and easy to store in a truck. Various devices have been utilized for weighing axle loads, although these devices have been unsuitable because they lack accuracy and are bulky.

SUMMARY OF THE INVENTION

It is an object of this invention to provide a highly portable device for accurate measurement of the weight of trucks and other wheeled vehicles.

It is another object of this invention to provide a portable weighing device which can be used to weigh a vehicle which slowly moves over the device.

According to the weighing scale of the present invention, a pair of air bags are connected to a single pressure gauge. The force exerted by the weight of a truck tire is directly measured on the guage, where the air pressure in the bags is at a given pounds per square inch such that one pound per square inch equals 383 pounds of load weight. The weighing scale can be used to weigh the total axle weight by placing one wheel on the scale and multiplying by a factor of two or by placing a scale under each wheel and connecting the scales by a hose.

The weighing scale of this invention is capable of being compacted to a small, rather flat compact structure which will fit in a truck cab or storage compartment. The scale includes a rigid platform to which a pair of air bags are permanently attached. Each air bag has a hose for connecting to the pressure gauge and to an inlet fill valve.

DESCRIPTION OF THE INVENTION

Figure 1:
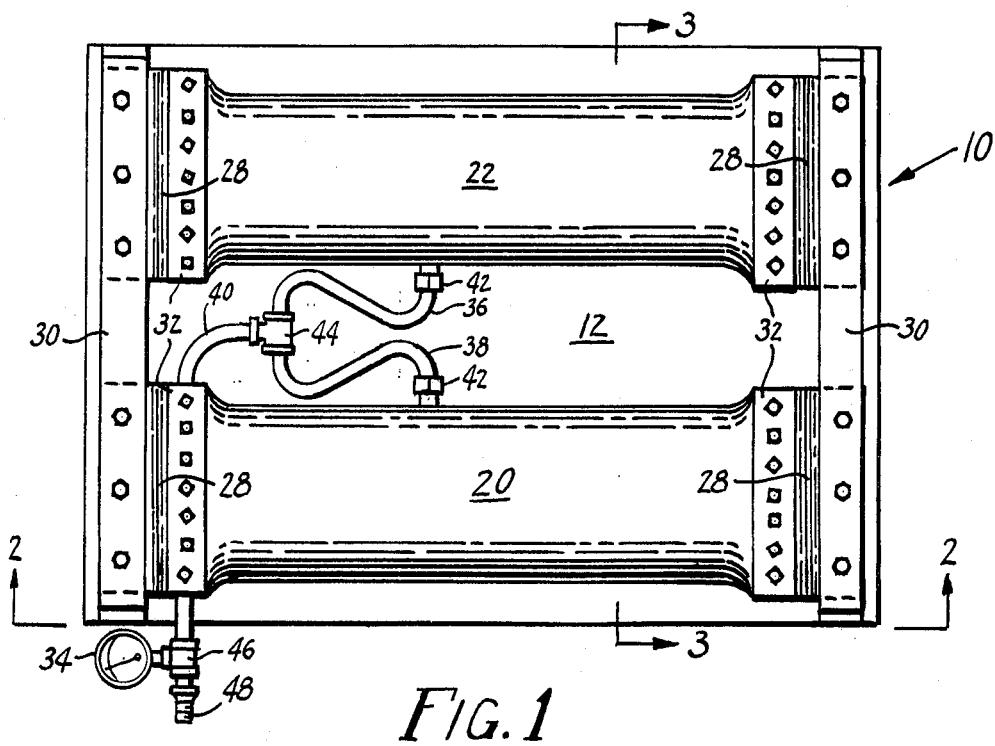
FIG. 1 is a plan view of the weighing scale device of this invention.
Figure 2:
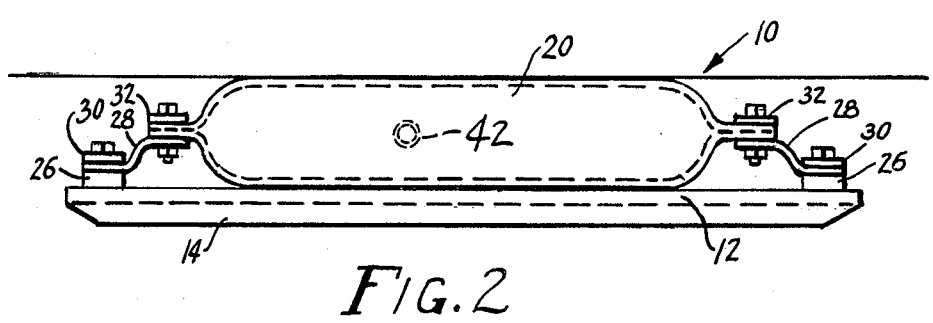
FIG. 2 is a side view taken along the line 2—2 of FIG. 1.

Referring to the drawings and in particular to FIG. 1, there is shown a weighing scale device 10 of the present invention. The device 10 includes a platform 12 made of wood, plastic, metal or some other rigid material which will support the wheel of a vehicle. The platform 12 has guide rails 14 and 16 for guiding a tire onto the platform. Mounted on the platform 12 on the bottom side 18 are a pair of air bags 20 and 22. Each air bag is secured to a bracket assembly 24. The bracket assembly 24 includes a support 26, a flexible retainer bracket 28 and bracket bars 30 and 32, as shown in FIG. 2.

The air bags 20 and 22 are made of a reinforced rubber and cord construction capable of withstanding weights in excess of 18,000 pounds. A typical weight of 18,000 pounds translates to bag inflation pressure of 50 pounds per square inch. When the weight of the truck is placed on the weighing scale device, one pound per square inch equals 383 pounds of load weight.

To measure the axle weight of a vehicle, each of the air bags 20 and 22 is connected to a pressure gauge 34 by air hoses 36, 38 and 40. There is a connector 42 on each air bag which connects to one end of an air hose. The other end of the air hose connects to a T connector 44. Air hose 40 connects the air bags to the pressure gauge 34. The pressure gauge 34 is connected to a second T connector 46. An air filler valve 48 is connected to the T connector 46.

Figure 3:
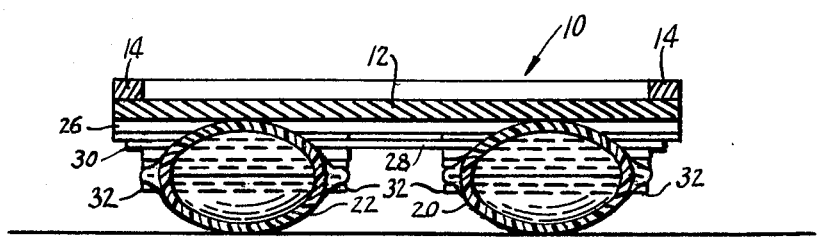
FIG. 3 is an end view of the weighing scale of FIG. 1.
Figure 4:
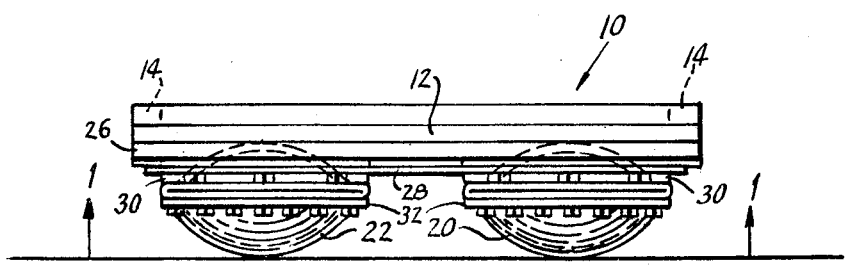
FIG. 4 is a cross-sectional view taken along the line 1—1 of FIG. 1.

To use the weighing scale 10 the air bags 20 and 22 are inflated through filler valve 48 to the desired pressure. With the air bags resting on the ground, a truck tire is driven onto the platform 12. The weight of the axle is determined by converting the pounds per square inch to pounds. As stated, each pound per square inch equals 383 pounds. FIGS. 3 and 4 shows the air bags 20 and 22 resting on the ground and the platform 12 ready to receive a truck tire.

By placing a number of these units under a larger platform and connecting them together and also to a pressure gauge, a platform scale of any size can be built, even one weighing 100,000 pounds or more, there are no limits as to size.

I claim:

1. A portable weighing scale device for determining the axle weight of a vehicle comprising:
   a tire receiving platform having guide rails on one side for positioning a vehicle tire;
   at least one inflatable bag mounted on the platform side opposite the tire guide rails for direct contact with the ground to support the axle weight of a vehicle;
   a fluid pressure guage connected to said inflatable bag by air hoses where the axle weight supported by said fluid bag is readable on said fluid pressure gauge; and
   a bracket means for attaching said at least one inflatable bag to the opposite side of said platform having flexible retaining bracket means fixed at each end of said inflatable bag and connected to the opposite side of said platform.

2. A portable weighting scale device as in claim 1 where in said bracket means includes a support member mounted on the opposite side of said platform to connect said flexible retaining bracket means to said platform, and bracket bar means to connect said flexible retaining bracket means to said inflatable bag.

3. A portable weighing scale device as in claim 1 or 2 wherein said inflatable bag is filled with air.

4. A portable weighing device as in claim 3 wherein said at least one inflatable bag is two inflatable air bags.

5. A portable weighing device as in claim 4 wherein said two inflatable bags have fluid hoses from each bag connected to said pressure gauge.

6. A portable weighing device as in claim 1 wherein said at least one inflatable bag is two inflatable bags having fluid hoses from each bag connected to said pressure gauge.

* * * * *